(12) United States Patent
Keefer et al.

(10) Patent No.: US 8,746,479 B2
(45) Date of Patent: Jun. 10, 2014

(54) METHOD OF CLOSING A FUEL TANK WITH A PIVOTAL DOOR AND SEAL

(76) Inventors: Neal L. Keefer, Portland, OR (US); Kenneth A. Watson, Vancouver, WA (US); Evan Waymire, West Linn, OR (US)

( * ) Notice: Subject to any disclaimer, the term of this patent is extended or adjusted under 35 U.S.C. 154(b) by 794 days.

(21) Appl. No.: 12/657,698

(22) Filed: Jan. 25, 2010

(65) Prior Publication Data

US 2010/0193513 A1 Aug. 5, 2010

Related U.S. Application Data

(60) Provisional application No. 61/206,489, filed on Jan. 30, 2009.

(51) Int. Cl.
*B60K 15/077* (2006.01)
*B60K 15/035* (2006.01)
*B60K 15/05* (2006.01)

(52) U.S. Cl.
USPC ............. 220/86.3; 29/225; 29/237; 29/455.1; 29/469; 29/525.01; 137/527.2; 137/527.4; 137/527.6; 137/588; 141/326; 220/203.23; 220/367.1; 220/827; 220/845; 220/849

(58) Field of Classification Search
USPC ....................... 137/215, 527–527.8, 587–588; 220/86.1–86.4, 202, 203.01, 203.04, 220/203.07, 203.23–203.27, 254.5, 264, 220/326, 367.1, 378, 801, 806, 823, 825, 220/827–830, 838, 845, 849; 29/428, 29/525.01, 525.11
See application file for complete search history.

(56) References Cited

U.S. PATENT DOCUMENTS

| | | | | |
|---|---|---|---|---|
| 996,099 A | * | 6/1911 | Leidecker | 137/515.7 |
| 2,048,943 A | * | 7/1936 | Munn | 137/527.4 |
| 2,503,031 A | * | 4/1950 | Davidson | 220/825 |
| 2,923,317 A | * | 2/1960 | McInerney | 137/527.2 |
| 3,331,391 A | * | 7/1967 | McRdinyan | 137/527 |
| 3,395,727 A | * | 8/1968 | Weise et al. | 137/527.4 |
| 3,730,216 A | * | 5/1973 | Arnett et al. | 137/588 |
| 3,951,297 A | * | 4/1976 | Martin | 220/86.3 |
| 4,022,245 A | * | 5/1977 | Davis | 137/559 |
| 4,301,833 A | * | 11/1981 | Donald, III | 137/521 |
| 4,630,748 A | * | 12/1986 | Keller | 220/86.3 |
| 4,699,638 A | * | 10/1987 | Harris | 96/113 |
| 4,715,509 A | * | 12/1987 | Ito et al. | 220/86.2 |
| 4,747,508 A | * | 5/1988 | Sherwood | 220/86.2 |
| 4,825,902 A | * | 5/1989 | Helms | 137/515 |
| 4,877,146 A | * | 10/1989 | Harris | 220/746 |
| 4,917,157 A | * | 4/1990 | Gifford et al. | 141/59 |
| 4,966,299 A | * | 10/1990 | Teets et al. | 220/746 |
| 4,977,936 A | * | 12/1990 | Thompson et al. | 141/312 |
| 4,995,433 A | * | 2/1991 | Beicht et al. | 141/312 |
| 5,183,087 A | * | 2/1993 | Aubel et al. | 141/59 |
| 5,186,220 A | * | 2/1993 | Scharrer | 141/59 |
| 5,282,497 A | * | 2/1994 | Allison | 141/59 |
| 5,322,100 A | * | 6/1994 | Buechler et al. | 141/312 |
| 5,431,199 A | * | 7/1995 | Benjay et al. | 141/59 |
| 5,439,129 A | * | 8/1995 | Buechler | 220/86.2 |

(Continued)

*Primary Examiner* — Anthony Stashick
*Assistant Examiner* — Ned A Walker
(74) *Attorney, Agent, or Firm* — Ingrid McTaggart

(57) ABSTRACT

A method for closing a fuel tank includes providing a base sized to be received within an interior of a fuel tank filler neck, movably mounting a closure structure on the base, and securing a biasing mechanism to the base wherein the biasing mechanism biases the closure structure into a closed position on the base.

8 Claims, 3 Drawing Sheets

(56) References Cited

U.S. PATENT DOCUMENTS

| | | | |
|---|---|---|---|
| 5,474,048 A * | 12/1995 | Yamazaki et al. | 123/519 |
| 5,775,357 A * | 7/1998 | Regna et al. | 137/43 |
| 6,019,127 A * | 2/2000 | Orita et al. | 137/515.7 |
| 6,026,853 A * | 2/2000 | Osterbrink | 137/527.4 |
| 6,029,719 A * | 2/2000 | Hor et al. | 141/348 |
| 6,230,739 B1 * | 5/2001 | Gericke | 137/588 |
| 6,338,362 B1 * | 1/2002 | Gabbey et al. | 137/588 |
| 6,405,767 B1 * | 6/2002 | Marsala et al. | 141/286 |
| 6,675,843 B2 * | 1/2004 | Yonezawa et al. | 141/301 |
| 6,755,057 B2 * | 6/2004 | Foltz | 70/159 |
| 6,805,159 B2 * | 10/2004 | Beaulne et al. | 137/589 |
| 6,923,224 B1 * | 8/2005 | McClung et al. | 141/350 |
| 6,968,874 B1 * | 11/2005 | Gabbey et al. | 141/349 |
| 6,991,006 B2 * | 1/2006 | Gramss et al. | 141/350 |
| 6,994,130 B1 * | 2/2006 | Gabbey et al. | 141/371 |
| 7,040,360 B2 * | 5/2006 | Watson | 141/255 |
| 7,182,109 B2 * | 2/2007 | Kolberg | 141/301 |
| 7,549,443 B2 * | 6/2009 | Levey et al. | 137/592 |
| 7,665,493 B2 * | 2/2010 | Groom et al. | 141/350 |
| 7,721,775 B2 * | 5/2010 | Pozgainer | 141/350 |
| 7,721,902 B2 * | 5/2010 | Grote et al. | 220/86.3 |
| 8,220,506 B2 * | 7/2012 | Aso | 141/305 |
| 8,316,881 B2 * | 11/2012 | Yamaguchi | 137/515.5 |
| 8,403,001 B2 * | 3/2013 | Ishizaka | 137/592 |
| 8,651,151 B2 * | 2/2014 | Berghorst et al. | 141/350 |
| 2002/0189711 A1 * | 12/2002 | Yonezawa et al. | 141/301 |
| 2005/0051236 A1 * | 3/2005 | Watson | 141/370 |
| 2005/0121085 A1 * | 6/2005 | Levey et al. | 137/592 |
| 2008/0185491 A1 * | 8/2008 | Bosch et al. | 248/346.5 |
| 2010/0126625 A1 * | 5/2010 | Berghorst et al. | 141/348 |

\* cited by examiner

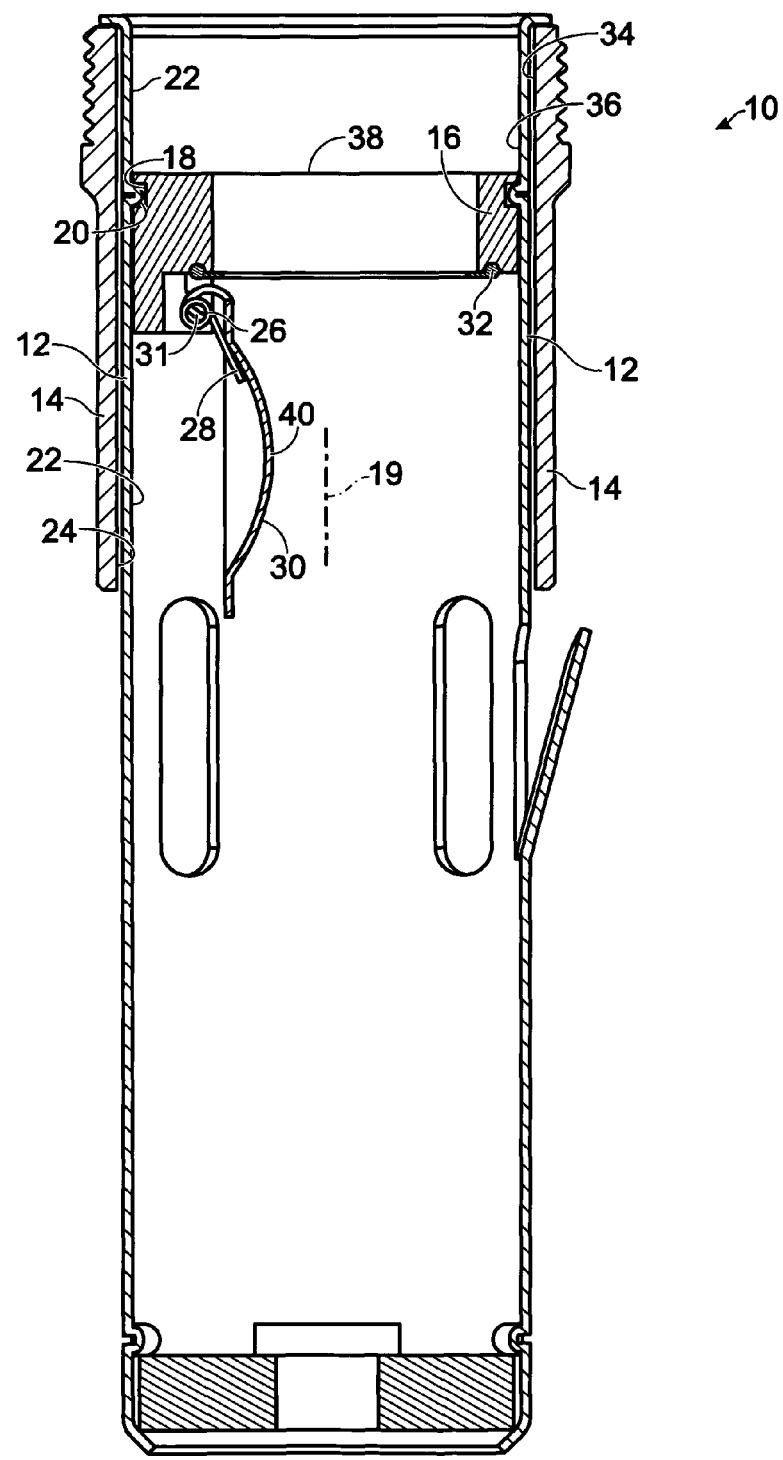

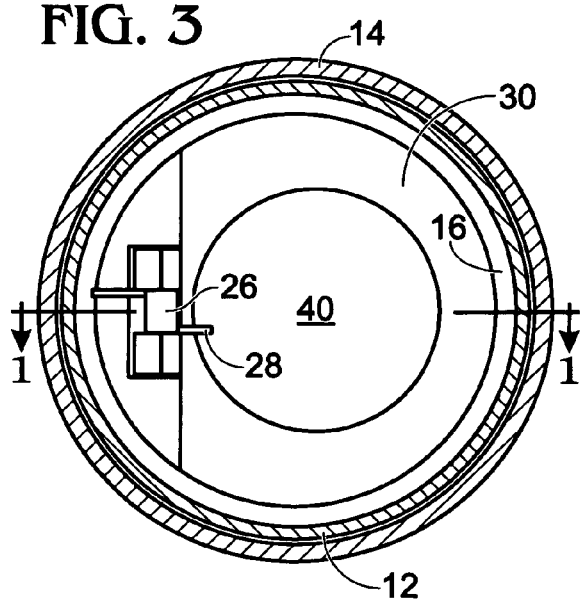

METHOD OF CLOSING A FUEL TANK WITH A PIVOTAL DOOR AND SEAL

This application claims the benefit of U.S. provisional patent application Ser. No. 61/206,489, filed Jan. 30, 2009.

BACKGROUND OF THE INVENTION

1. Field of the Invention

The present invention relates to a fuel tank closure device and method, and in particular, to a fuel tank flapper door, to reduce the fuel and/or fumes that may exit a fuel tank when a fuel cap is not positioned on a fuel tank opening.

2. Background of the Invention

Fuel tanks may include a cap removably secured to a fuel tank opening to seal the opening of the fuel tank during use of the vehicle to which the cap is attached. However, in some instances the cap may not be installed after a fuel fill up or may be improperly installed and fall from the fuel tank opening during use. In such situations, fuel and/or fumes may exit the fuel tank through the fuel tank opening. It may be desirable to reduce the fuel and/or fumes that may exit the fuel tank opening when the cap is not positioned thereon.

OBJECTS OF THE INVENTION

It is an object of this invention to provide a fuel tank closure device and method that reduces fuel and/or fumes that are released from a fuel tank when a cap is not positioned on the fuel tank opening.

SUMMARY OF THE INVENTION

The present invention provides a fuel tank closure device, namely, a biased door assembly, that may be installed within the neck of a fuel tank filler assembly. In a nominal position the door may be biased into an closed position so as to seal the fuel tank filler neck and thereby reduce fuel and/or fumes that may exit through the fuel tank filler assembly when a cap is not sealingly positioned thereon. The door may be moved to an open position by placement of a fuel pump nozzle downwardly within the fuel tank filler neck, so that fuel may be pumped into the fuel tank through the fuel tank filler neck, without hindrance by the door assembly. After removal of the fuel pump nozzle, the door is biased back into the closed position to seal the fuel tank filler neck.

BRIEF DESCRIPTION OF THE DRAWINGS

FIG. 2 is a side cross sectional view of the device of FIG. 1 with a flapper door assembly in an open position.

FIG. 3 is a bottom cross sectional view of a fuel tank closure device installed in a fuel tank filler neck, the section taken along section line 3-3 of FIG. 1.

DETAILED DESCRIPTION OF THE EMBODIMENTS

Figure 1:
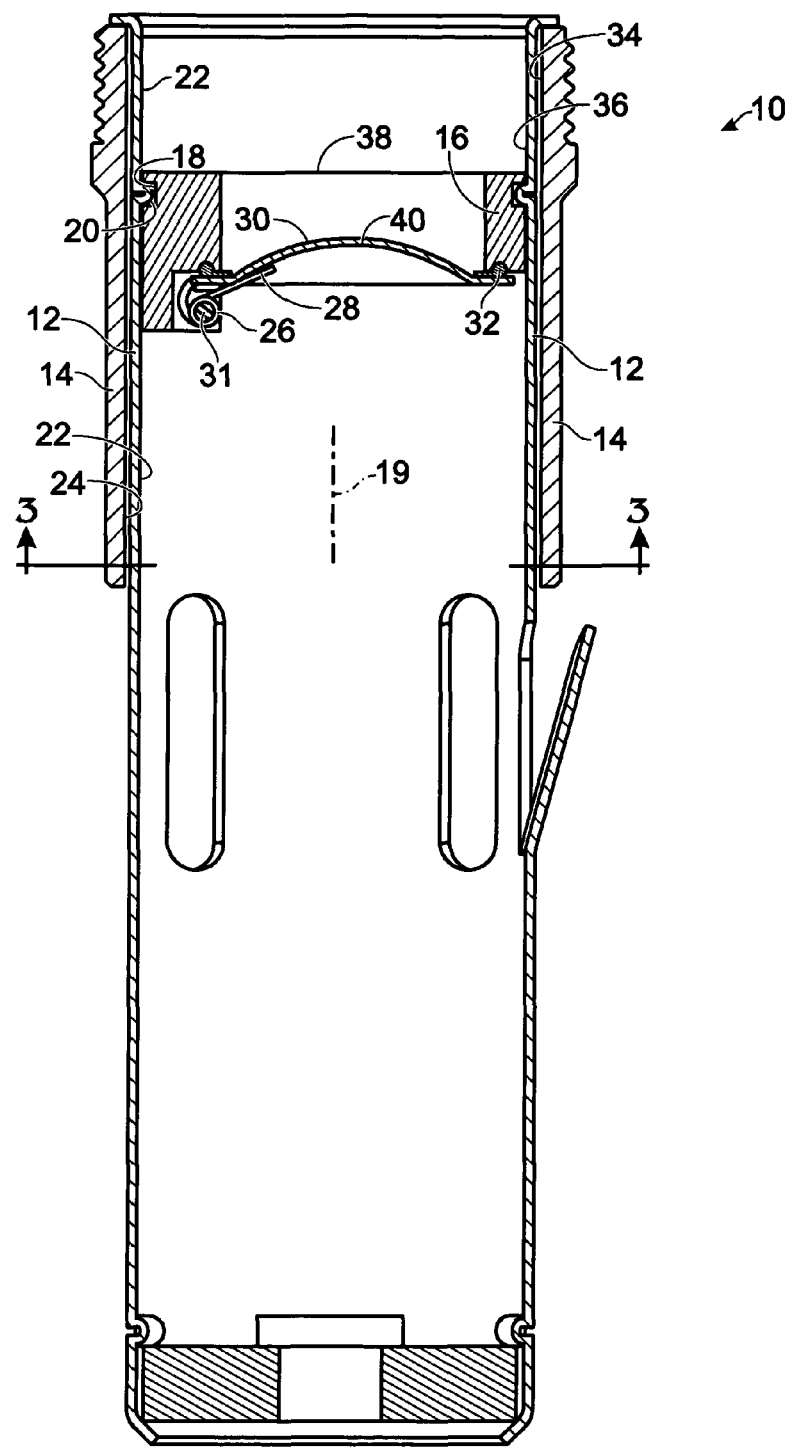
FIG. 1 is a side cross sectional view of a fuel tank closure device installed in a fuel tank filler neck, the section taken along section line 1-1 of FIG. 3.

FIG. 1 is a side cross sectional view of a fuel tank closure device assembly 10, also referred to as a fuel tank flapper door assembly 10, installed in an anti-siphon device 12, that is installed a fuel filler neck 14. Fuel filler neck 14 may be installed in a fuel tank (not shown) so as to allow a fuel pump nozzle (not shown) to be inserted therein for filling the tank with fuel. Anti-siphon device 12 may be installed within fuel filler neck 14 to reduce or prohibit undesirable siphoning of fuel from the fuel tank. Fuel tank flapper door assembly 10 may be installed within anti-siphon device 12 or directly into fuel filler neck 14.

Flapper door assembly 10 may include a cylindrical base 16 including an exterior circumferential groove 18 that may receive therein a protrusion 20 extending outwardly from an inner wall 22 of anti-siphon device 12, to secure assembly 10 in place within anti-siphon device 12, and thereby to secure assembly 10 in place within fuel filler neck 14. Groove 18 may be positioned perpendicular to an elongate axis 19 of base 16. In one embodiment, protrusion 20 (and groove 18) may extend around a portion of a circumference of the inner wall 22 of anti-siphon device 12, around several portions of the inner wall 22 of device 12, or completely around the inner wall 22 of anti-siphon device 12. In other embodiments, flapper door assembly 10 may be secured to the inner wall 22 of an anti-siphon device 12 or the inner wall 24 of a fuel filler neck 14 by any available means such as set screws, inwardly extending tabs, welding, threads, adhesive, or the like.

Base 16 of assembly 10 may include secured thereto a hinge mechanism 26 that may include a biasing device 28, such as a spring, so that a door 30, secured on base 16 by a pin 31, is biased into sealing engagement with an O-ring 32 on cylindrical base 16. A force of spring 28 may be overcome by the downward force of a fuel pump nozzle (not shown) on door 30 when such a nozzle is inserted through an opening 34 of fuel filler neck 14, through an opening 36 of anti-siphon device 12, and through an opening 38 of cylindrical base 16 such that the fuel tank may be filled with fuel. Door 30 may include a domed region 40 in a central portion thereof to strengthen the door 30 and to increase the sealing properties of the door 30 against O-ring 32. Domed region 40 may extend upwardly into opening 38 of base 16.

Once the fuel pump nozzle is removed, spring 28 may bias door 30 to move into sealing engagement with O-ring 32 on cylindrical base 16. In this manner, fuel and/or fumes may be hindered from exiting the fuel tank even when a fuel cap (not shown) is not installed on, or has fallen from, the fuel filler neck 14. An air tight seal between anti-siphon device 12, or fuel filler neck 14, and cylindrical base 16 may be enhanced by use of a second O-ring (not shown) which may be positioned within a circumferential groove of cylindrical base 16 so that such an O-ring would be positioned between base 16 and inner wall 22 of anti-siphon device 12.

Now referring to FIG. 2, door 30 is shown in an open and lowered position when a fuel pump nozzle (not shown) is placed within filler neck 14. After removal of the fuel pump nozzle (not shown), spring 28 biases door 30 back into the closed and raised position (shown in FIG. 1) so as to seal fuel filler neck 14 against the escape of fuel and/or fumes from the fuel tank to which the fuel filler neck 14 is secured.

In one embodiment, base 16 and door 30 may be manufactured of a generally rigid plastic, and pin 31 and biasing device 28 may be manufactured of metal. In particular, base 16 may be manufactured of a material that may be press fit into the interior of anti-siphon device 12 such that the base 16 may be pressed downwardly over protrusion 20 positioned on inner wall 22 of anti-siphon device 12 until protrusion 20 is received within groove 18 of base 16 so as to secure base 16 within anti-siphon device 12. However, any materials suitable for a particular application may be utilized in the device 10 of the present invention.

A method of sealing a fuel filler neck assembly will now be described. The method includes securing a base 16 within a fuel filler neck assembly 14, the base defining an opening 38 for the passage of fuel therethrough. The method also includes movably securing a closure structure 30 on the base 16, the closure structure 30 movable between a closed position wherein the closure structure seals the opening 38 and an open position wherein the closure structure 30 is moved out of position from the opening 38, thereby allowing the passage of fuel through the opening. The method also includes securing a biasing structure 28 on the base 16, the biasing structure 28 biasing the closure structure 30 into the closed position in a nominal condition, i.e., in the absence of an external force on closure structure 30.

FIG. 3 is a bottom cross sectional view of a fuel tank flapper door assembly 10 showing door 30 in a nominal closed and raised position.

Other variations and modifications of the concepts described herein may be utilized and fall within the scope of the claims below.

We claim:

1. A method of sealing a fuel filler neck assembly, comprising:
   installing an anti-siphon sleeve inside a fuel filler neck so that a flange of said anti-siphon sleeve is seated on a rim of said fuel filler neck;
   securing a base within said anti-siphon sleeve by seating an annular shoulder of said anti-siphon sleeve in an annular groove of said base, said base having an opening for the passage of fuel and a circular segment base with a recessed portion;
   providing an O-ring around said opening;
   securing a biasing structure to said recessed portion;
   pivotally attaching a hinged closure to said recessed portion, said hinged closure movable between:
      a closed position wherein said hinged closure is biased into sealing engagement with said O-ring to seal said opening and prevent fuel from escaping; and,
      an open position wherein said hinged closure is moved by a fuel pump nozzle to unseal said opening and allow fuel to flow through said opening.

2. The method of sealing a fuel filler neck assembly of claim 1, wherein said biasing structure biases said hinged closure toward said closed position in absence of an external force on said hinged closure.

3. The method of sealing a fuel filler neck assembly of claim 1, said base further comprising a cylindrical outer surface and a cylindrical inner surface, said cylindrical inner surface defining an interior passage as said opening.

4. The method of sealing a fuel filler neck assembly of claim 1, wherein said hinged closure is a door having a domed top extending upwardly into said opening when said hinged closure is in said closed position.

5. A method of closing a fuel tank, comprising:
   providing an anti-siphon sleeve having an interior;
   installing an annular base entirely within said interior of said anti-siphon sleeve, said annular base comprising:
      a passage receiving a fuel pump nozzle, said passage extending between a top edge and a bottom edge;
      a cylindrical sidewall having an upper groove; and,
      a base protrusion extending below said bottom edge;
   surrounding said bottom edge with a seal;
   securing a pivotal door to said base protrusion, said pivotal door comprising:
      a biased hinge mechanism;
      an annular flange; and,
      a convex top surface;
   wherein said pivotal door pivots between:
      an open position wherein said pivotal door unseals said interior passage to allow fluid flow; and,
      a closed position wherein said pivotal door, biased by said biased hinge mechanism, seals against said sealing member to prevent fuel flow.

6. The method of closing a fuel tank of claim 5, wherein said annular flange seals against said seal and said convex top surface extends substantially into said passage when said pivotal door is in said closed position.

7. The method of closing a fuel tank of claim 5, wherein said annular flange is unsealed from said seal and said convex top is outside of said passage when said pivotal door is in said open position.

8. A method of sealing a fuel tank, comprising:
   installing an anti-siphon sleeve inside a fuel filler neck so that a flange of said anti-siphon sleeve is seated on a rim of said fuel filler neck, and a bottom of said anti-siphon sleeve extends beyond a distal end of said fuel filler neck;
   providing a base that defines an inner end wall, a cylindrical outer surface including an upper groove extending at least partially around a circumference of said cylindrical outer surface, and an inner surface that defines a circular interior opening for the passage of a fuel pump nozzle;
   movably mounting a closure structure on said inner end wall of said base via a pin, said closure structure having a central dome extending upwardly;
   securing a biasing mechanism to said base, wherein said biasing mechanism biases said closure structure into a closed position on said base such that said closure structure covers said circular interior opening of said base and said central dome extends into said circular interior opening;
   securing an annular sealing member to said base, said annular sealing member engaging with a peripheral portion of said closure structure when said closure structure is in said closed position; and,
   wherein insertion of a fuel pump nozzle moves said closure structure into an open position such that said central dome is substantially spaced from said circular interior opening.

* * * * *